Nov. 13, 1951 W. J. COULTAS ET AL 2,574,691
MOWER CUTTER BAR MOUNTING AND ADJUSTING MEANS
Filed May 11, 1948 3 Sheets-Sheet 3

Inventors:
Wilbur J. Coultas,
Nolan D. Colvin,
William B. Palmer,
By
C. T. Parker and
Attys.

Patented Nov. 13, 1951

2,574,691

UNITED STATES PATENT OFFICE 2,574,691

MOWER CUTTER BAR MOUNTING AND ADJUSTING MEANS

Wilbur J. Coultas and Nolan D. Colvin, Moline, and William B. Palmer, Rock Island, Ill., assignors to Deere & Company, Moline, Ill., a corporation of Illinois Application May 11, 1948, Serial No. 26,323

12 Claims. (Cl. 56—25)

This invention relates to an agricultural implement and more particularly to an agricultural implement of the mower type. More specifically, the invention relates to general improvements in mowers and particularly to improvements in means for raising and lowering the mower cutter bar, or comparable implement part, and means for arranging an implement for connection to or disconnection from the tractor or other carrying vehicle.

Although the principles of the invention are applicable to a wide variety of agricultural implements, it is especially adapted for use in connection with tractor mounted mowers. Still further, certain parts of the invention may be readily adapted to mowers of any type.

The usual mower includes a carrying frame and cutting mechanism mounted thereon. In the case of a tractor mounted mower, the tractor provides the carrying frame. In any case, the cutting mechanism includes a cutter bar mounted on the carrying frame for vertical movement between a horizontal operating position and a substantially vertical transport position, provision being made for folding the cutter bar about a longitudinal, horizontal axis to provide for vertical swinging of the same. Part of the range of movement of the cutter bar from its horizontal position to its vertical position is, of course, utilized in the operation of the mower, inasmuch as the cutter bar is adapted to be raised and lowered within a limited range to vary the cutting height thereof. Further, in any case, the lateral overhang or extension of the cutter bar is such that the cutter bar constitutes a powerful lever arm and the mechanism for raising and lowering the cutter bar must include means affording the necessary power to accomplish the raising and lowering. Whether the raising and lowering means is manually or power operated, it is found desirable in most cases to provide a counter-balancing or assisting spring connected between the carrying frame and the lifting mechanism in such manner as to tend to balance the natural tendency of the cutter bar to remain in its horizontal position because of its own weight.

Because of the relatively great power of this counter-balancing or assisting spring, it has been found that retaining of the spring in its operating position while the mower is being disconnected from the tractor or is otherwise placed in a stored or temporary unused position, is disadvantageous, both from the standpoint of over-tensioning the spring and from the standpoint of leaving the mower with uncontrollable parts likely to cause collapse of the mower about its normal operating pivots. One of the principal objects of the present invention relates to means for relieving the tension on the counterbalancing or assisting spring when the mower is placed in disconnected or unused position. In this respect, it is an important object to utilize the powerful lever arm of the cutter bar as means for accomplishing the relieving of tension on the spring. Specifically, it is an object of the invention to utilize the cutter bar for temporarily stretching the spring so that part of the lifting means may be disconnected, after which the cutter bar is moved manually to its vertical position and the spring may retract to a no-load condition.

A further object of the invention pertains to the provision, as part of the lifting and lowering means, of an arm having a plurality of apertures and a notch therein, and to utilize one of the apertures for effecting a connection between the cutter bar and arm, to utilize another aperture for holding the cutter bar in raised position, and to use the notch as means for connecting a detachable member between the arm and cutter bar whereby the cutter bar may be forcibly depressed for the purpose of relieving stress on the connecting link so that the link may be removed to permit the spring to assume a no-load position.

Still further objects of the invention are to improve mower constructions in general, and specifically to provide a mower frame comprising relatively few parts easily assembled and providing for a highly efficient and economical mower construction.

The foregoing and other important objects and desirable features inherent in and encompassed by the invention will become apparent to those skilled in the art as the disclosure is more fully made of a preferred form of the invention in the following detailed description and accompanying sheets of drawings, in which.

Although the invention has been illustrated in connection with a mower of a particular type, the applicability of the invention to other mowers and other implements in general will become apparent as the description progresses. It should be understood, therefore, that the specific disclosure is to be taken as illustrative and not limiting.

The mower shown here is of the tractor-mounted type and the tractor may be of any well known type, here being shown as including a rear body portion 10 carried on laterally spaced traction wheels 11 and 12. The body 10 carries between the wheels 11 and 12 an operator's seat 13 beneath which may be located power control mechanism (not shown) of any conventional type including a power control arm 14 which may be utilized to supply the necessary power for raising the mower or implement part to be hereinafter described.

Figures 3, 7:
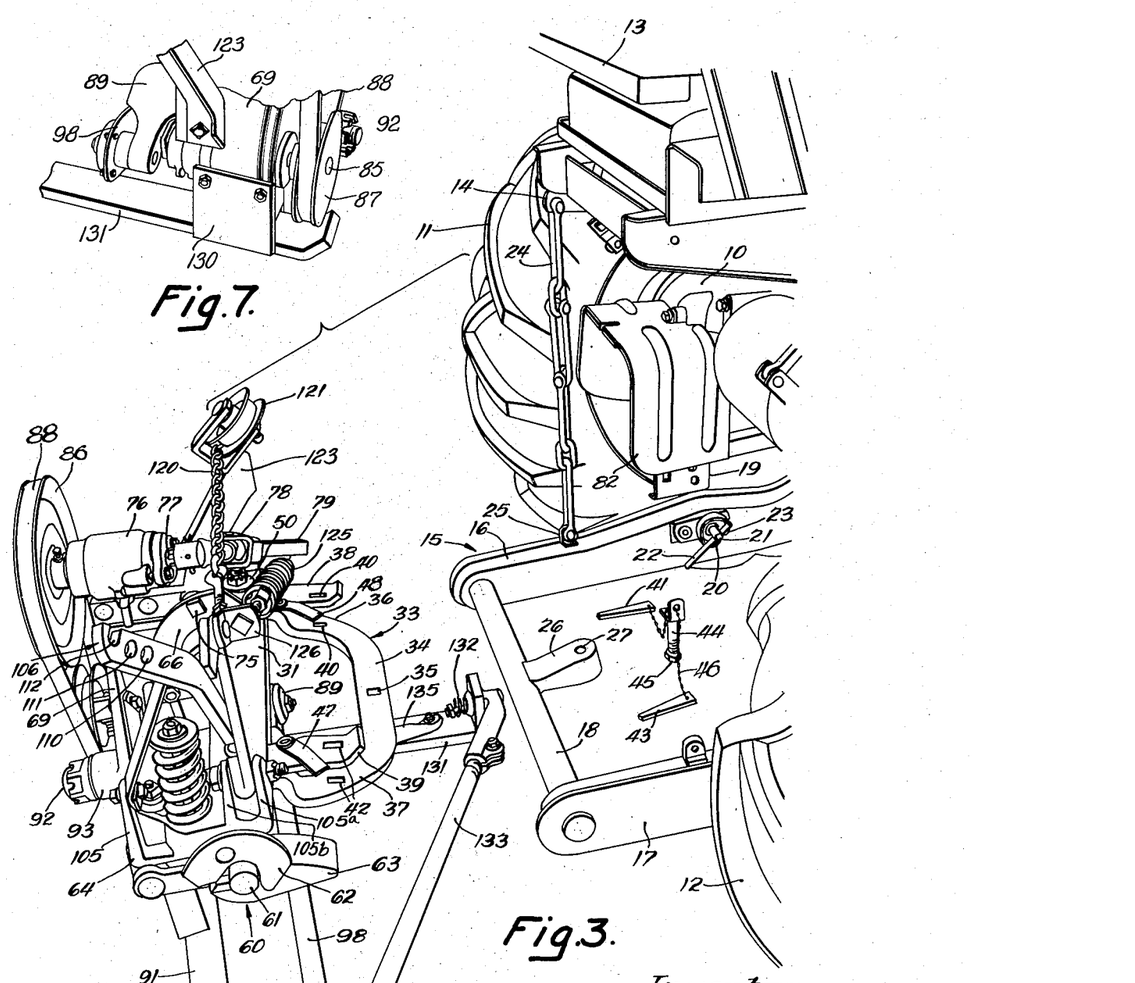
Figure 3 is a perspective view, on an enlarged scale, showing the mower in a disconnected position with respect to the tractor.
Figure 7 is a fragmentary perspective view of the left-hand rear portion of the mower, showing the mounting of the supporting skid on the mower drive casting.

Figure 3 shows the tractor as being equipped with a drawbar, indicated generally by the numeral 15. This drawbar may be of the type including a pair of forwardly extending side members 16 and 17 and a rear transverse member or bar 18, as in U. S. Patent 2,503,096. The forward portions of the members 16 and 17 may be pivoted to a part of the tractor for vertical swinging of the drawbar about a transverse axis, the details of which form no part of the present invention and have therefore not been illustrated and will not be described. The drawbar 15 is normally locked in any one of a plurality of selected positions by means of a perforated plate 19 carried by the tractor and releasable means 20 carried by the drawbar. The releasable means may include a pin 21 equipped with a handle 22 and adapted to engage any one of a plurality of apertures in the plate 19. Associated with the handle 22 is a cam member 23 having alternate high and low stops for engaging the handle 22 so that the pin 21 may be held in retracted position out of engagement with the plate 19 or may be permitted to move into engagement with any one of the apertures in the plate 19. When the locking means is engaged, of course, the drawbar cannot move vertically. However, the locking means may be released so that the drawbar may be moved vertically by means of the power control arm 14 and a chain 24 connected between the arm and an ear 25 on the left hand drawbar member 16. The drawbar further includes a connecting member 26 rigidly connected preferably to a mid-point of the transverse bar 18 and extended forwardly therefrom. The member 26 has a vertical aperture 27, which is used to connect the mower to the tractor in a manner to be set forth below.

The mower includes a main frame structure, designated generally by the numeral 30 and comprising upper and lower transverse members 31 and 32. The lower member has rigidly secured thereto forwardly extending hitch structure, designated generally by the numeral 33, the details of which form the subject matter of our co-pending application, Serial No. 26,324, filed May 11, 1948. Briefly, the hitch structure includes a forwardly extending U-shaped member having a transverse bight portion 34 apertured at 35 and provided with rearwardly extending legs 36 and 37. The leg 36 is provided with a forwardly extending upper portion 38 spaced thereabove to provide a pocket capable of receiving the left hand end portion of the transverse drawbar member 18. The right hand leg 37 is provided with a similar portion 39 for the same purposes with respect to the right hand end portion of the bar 18. The portions 36 and 38 are vertically apertured in alignment at 40 for the purpose of receiving a securing member in the form of a wedge 41; and the portions 37 and 39 are similarly apertured at 42 for the purpose of receiving a similar wedge 43. Although these parts are shown in disconnected positions in Figure 3, it will be understood that the tractor is backed toward the mower until the bar 18 is received in the pockets formed by the portions 36—38 and 37—39, after which the wedges 41 and 43 are dropped in place. The vertical aperture 35 comes directly below the aperture 27 in the connecting member 26 on the drawbar 15, and the aligned apertures receive a securing means in the form of a bolt 44 having a nut 45. The wedges 41 and 43 and the bolt 44 are interconnected by a flexible element in the form of a chain 46 which precludes separation of the elements and guards against loss thereof. When the mower is connected to the tractor drawbar by the means just referred to, right and left hand pivoted spring clips 47 and 48 are respectively moved in place to engage the wedges 43 and 41 to prevent dislodging of the wedges.

Figures 4, 5, 6:
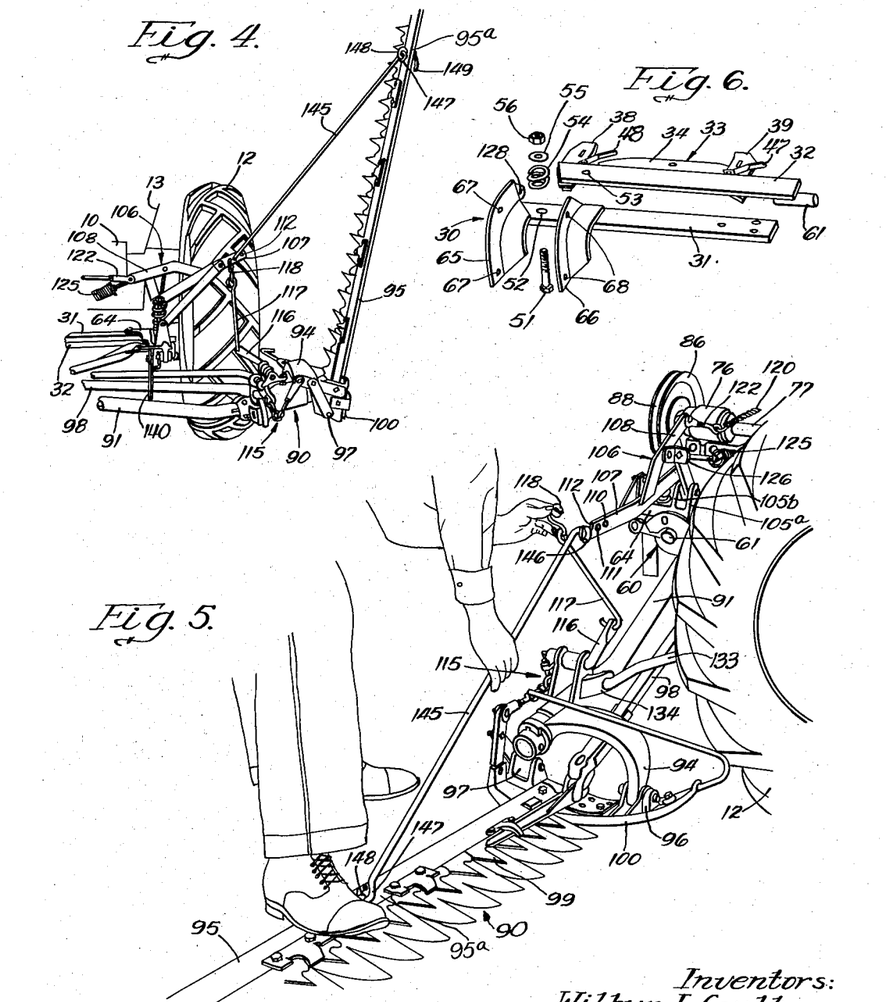
Figure 4 is a fragmentary perspective view showing the rear portion of the tractor and mower with the cutter bar in vertical or transport position.
Figure 5 is a fragmentary perspective view showing the manner of utilizing the cutter bar as a lever arm in relieving the load on the counterbalancing or assisting spring.
Figure 6 is an exploded perspective view showing the main components of the mower.

As best shown in Figure 6, the members 31 and 32 are substantially coextensive and are connected together at their stubbleward ends by means providing a pivot on a vertical axis, the general location of which is visible at 50 in Figure 3 and the components of which comprise a vertical pivot pin 51 which passes respectively through apertures 52 and 53 in the members 31 and 32. The pin or bolt 51 is held in place to interconnect the parts by means of a spring, washer, and nut, designated respectively at 54, 55 and 56. The arrangement is such that the member 31 is carried directly on the member 32 for rearward swinging of the former with respect to the other about the axis provided by the pin or bolt 51. The grassward ends of the members 31 and 32 are releasably interconnected by release means, indicated generally by the numeral 60, including a pintle 61 on the member 32 and spring-loaded latch members 62 and 63 carried on bracket structure 64 rigidly secured to the grassward end of the member 31. The particular type of latch mechanism shown forms the subject matter of the U. S. Patent to Coultas 2,292,362; although, many well known types of release means may be substituted therefor. When the two members 31 and 32 are interconnected by the release means 60, they form, in effect, a single structural member for the mower and therefore will be hereinafter collectively referred to as the mower structure 30, except as regards characteristics peculiar to one member or the other.

Figures 1, 2:
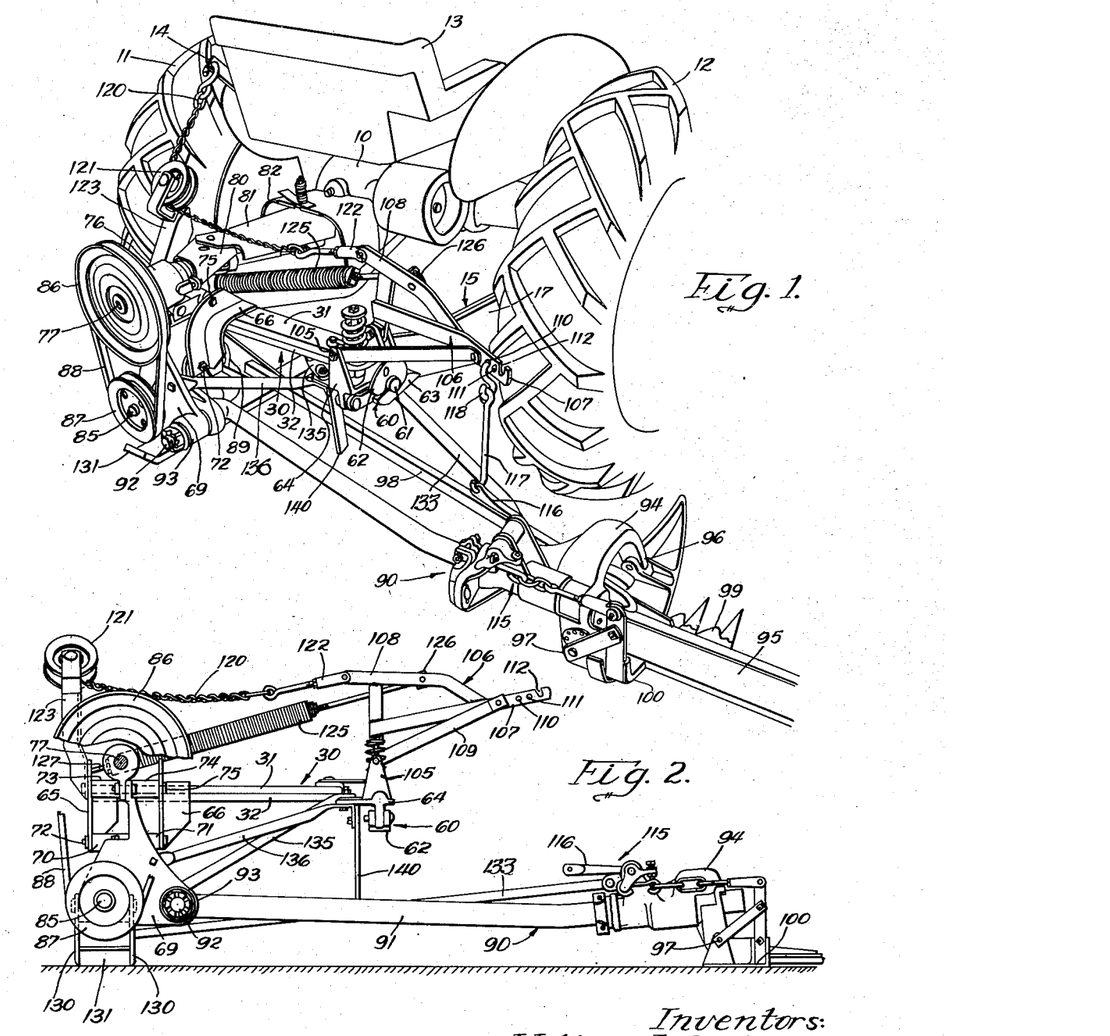
Figure 1 is a perspective view of a rear portion of a tractor-mounted mower.
Figure 2 is a rear elevational view of the mower as shown resting on the ground, portions of the mower being broken away to disclose structural parts thereof.

The stubbleward end of the mower structure 30 is provided with mounting means in the form of a pair of rearwardly and downwardly extending angle bars 65 and 66 (Figures 2 and 6), the vertical flange of each of which is provided with transverse apertures 67 and 68, respectively, to provide for the mounting of a support which here takes the form of a casting or housing 69. As best shown in Figure 2, an intermediate portion of the support or housing is provided with left and right hand laterally extending bosses 70 and 71, respectively, through which and the lower aligned apertures 67 and 68 a bolt 72 is passed to provide means for securing the housing to the flanges of the members 65 and 66. An upper portion of the housing 69 is provided with a similar pair of bosses 73 and 74 apertured in alignment to receive a transverse bolt 75 which is passed through the upper aligned pair of apertures 67 and 68 in the angle members 65 and 66. The casting or support 69 is thus simply and rigidly held in place on the mower structure 30, specifically on the upper member 31.

The casting or support 69 carries at an upper portion thereof a bearing 76 for journaling a longitudinal shaft 77. This shaft extends forwardly and has a universal joint connection 78 (Figure 3) with a shaft part 79 which may form part of a conventional power take-off connection to the power take-off shaft (not shown) of the tractor. Suitable safety shielding including separable sections 80, 81 and 82 (Figure 1) may be provided for enclosing the power take-off connection. In the drawings the shield section 82 conceals the power take-off shaft of the tractor, but since the construction in this respect is well known to those skilled in the art it is deemed unnecessary to illustrate it further.

The lower portion of the supporting casting 69 journals a shaft 85 which is below and parallel to the shaft 77. The rear ends of the shafts 77 and 85 have respectively keyed thereto driving pulleys 86 and 87 which are connected by an endless belt 88. The forward end of the shaft 85 may be provided with the conventional pitman eccentric, as indicated at 89 in Figures 1, 3 and 7 and as shown, for example, in U. S. Patent 2,477,687.

The supporting structure provided by the casting 69 provides means for carrying on the mower structure 30 cutting mechanism, indicated generally by the numeral 90. This cutting mechanism includes a laterally extending drag bar or coupling bar 91 having its stubbleward end bent at 92 to provide a longitudinal pivot in cooperation with a bearing 93 on the casting 69. The grassward end of the drag bar 91 may be provided, as is conventional, with a yoke 94 to which is connected a laterally extending cutter bar 95. The connection between the cutter bar and yoke is on a longitudinal pivot axis through aligned portions 96 and 97. The cutting mechanism thus constitutes an implement part vertically swingably carried by the supporting structure 30, or for movement in two phases (here upwardly and downwardly). In the case of the mower illustrated, the coupling or drag bar 91 is pivoted on the casting 69 and the cutter bar is in turn pivoted on the coupling bar. The pitman eccentric 89 is connected to the stubbleward end of a transversely extending pitman 98 (Figures 3 and 7), the grassward end of which is connected, as usual, to a knife or sickle 99 carried by the cutter bar 95, so that power developed by the power take-off shaft of the tractor may be transmitted through the pulleys 86 and 87 to the knife or sickle 99. That portion of the cutter bar 95 that provides the connection with the yoke 94 of the drag bar 91 includes a ground-engaging shoe 100 on which the cutting mechanism rides when the cutter bar is in operating position.

The bracket 64 at the grassward end of the mower structure 30 is provided with a plurality of longitudinally spaced upwardly extending ears comprising a rear ear 105 (Figs. 1 and 2) and a pair of closely spaced and alined forward ears 105a and 105b (Figs. 3 and 5) which provide pivot means on a longitudinal, horizontal axis for carrying a movable member in the form of a bell crank structure, indicated generally by the numeral 106. The bell crank includes a first, laterally extending arm 107 and integral means providing a second, vertical arm 108. The bell crank is appropriately braced by a bar 109 which is pivoted to the rear ear 105 on the bracket 64. The bell crank or member 106 is thus rockable in opposite directions about the longitudinal pivot axis through the bracket 64 so that the arm 107 moves vertically and the arm 108 moves laterally. The grassward end of the arm 107 is provided with a pair of apertures 110 and 111 and also with a connection element in the form of a notch 112. The yoke 94 of the cutting mechanism is provided with gag lever mechanism, indicated generally at 115, which may be of any well known construction, including a laterally inwardly extending arm 116 which is operable by the bell crank 106 in a manner to be presently described.

The load-transmitting means for interconnecting the bell crank 106 comprises a detachable link 117 having a hooked lower end receivable by the apertured end of the gag lever arm 116. The upper end of the link is formed as an eye to receive a detachable lost-motion connecting means in the form of an S-hook 118 connectible to the bell crank arm 107 by means of the inner aperture 110. It will thus be seen that rocking of the bell crank about its pivot axis will be in unison with raising and lowering of the cutter bar 95, the detachable link means 117—118 being stressed between the bell crank and cutter bar by upward movement of the arm 107, to raise the cutter bar, and by descent of the cutter bar to its horizontal position.

The means for rocking the bell crank 106 is here shown as being power operated and as deriving its power from the power control arm 14. When the mower is mounted on the tractor, the lifting chain 24 previously described is disconnected from the arm 14 so that the arm may receive one end of a lifting chain 120 (Figure 1). This chain passes around a sheave 121 on the mower structure and is connected at 122 to an inner portion of the bell crank 106. The sheave 121 is carried on a support 123 which is in turn rigidly carried by the mounting structure including the left hand angle member 65 (Figure 2). It will be understood of course that the lifting means illustrated is only representative of many forms that the lifting means could assume, and need not necessarily be power operated.

Since the mounting of the cutter bar 95 is such that its weight will naturally cause it to remain in its horizontal or operating position, a good deal of power is required in most instances to elevate the cutter bar, the amount of power required being in direct proportion to the length of the cutter bar. For the purpose of counter-balancing the weight of the cutter bar, it is customary to provide a spring or equivalent resilient or yieldable means associated in an appropriate manner with the lifting and lowering mechanism. Such means is utilized in the present case and includes a coiled tension spring 125 connected at one end at 126 to the bell crank 106. The spring extends laterally to the left hand side of the frame structure and includes a connecting member in the form of a bolt 127 (Figure 2) received by a forwardly extending ear 128 on the left hand angle member 65 (Figure 6). The spring is normally tensioned to urge the bell crank 106 in a counterclockwise direction, as viewed in Figures 1 and 2, thereby stressing or tensioning the link means 117—118 and acting through the gag lever mechanism 115 in opposition to the natural tendency of the cutter bar 95 to remain in its horizontal or operating position. The spring 125 thus acts in parallel with the lifting mechanism for raising the cutter bar 95.

As best shown in Figures 2 and 7, the support or casting 69 has secured to a lower portion thereof a pair of depending plates 130 which are spaced apart laterally to provide means for carrying a ground-engaging member in the form of a longitudinal skid 131. The skid extends forwardly a substantial distance ahead of the hitching structure 33 and at its forward end is connected at 132 to the forward end of a horizontally disposed, diagonally extending brace 133, the rear end of which is connected at 134 to an upper portion of the yoke 94, thus providing bracing means between the forward end of the skid and the grassward end of the drag bar 91. As best indicated in Figure 1, the skid 131, during normal or operating position of the tractor and mower, extends forwardly substantially directly below those parts of the driving mechanism including the shaft 85, pulley 87 and pitman eccentric 89, thus affording protection to these parts against obstacles in the field. The forward portion of the skid 131 is additionally braced with respect to the frame structure 30 by means of a rearwardly and upwardly extending brace member 135 (Figures 2 and 3), the forward end of which is connected to the skid 131 and the rear end of which is connected to the bracket 64 at the grassward end of the frame structure 30. The frame structure is additionally braced by means of a transverse brace 136 which is connected at its stubbleward end to the casting or support 69 and at its grassward end to the bracket 64 (Figure 2).

When the mower is disconnected from the tractor and rests on the ground, as shown in Figure 2, the skid 131 serves as a support for carrying the stubbleward side of the mower. Inasmuch as the cutting mechanism is connected to the mower frame structure 30 by means of the pivots at 92—93, it is obvious that the grassward end of the mower structure would collapse if not supported. For this purpose, there is provided at the grassward side of the mower structure 30 a depending member 140 rigidly secured at its upper end to the bracket 64 and having its free or lower end engageable with an intermediate portion of the drag bar 91. The member 140 serves the dual function of a support when the mower is in the disconnected position, as shown in Figure 2, and as a stop for limiting upward swinging of the drag bar 91 during normal operation of the mower when mounted on the tractor, as shown in Figure 1. The stop or limiting function of the member 140 is important from the standpoint of preventing excess upward movement of the coupling bar, thereby eliminating the possibility that the pitman 98 will be damaged by striking part of the mower frame structure 30.

When it is desired to transport the mower, as when moving the unit from one field to another, the cutter bar 95 may be folded or moved to a vertical transport position, as shown in Figure 4, in which case the cutter bar is pivoted about the pivots 96—97 on the yoke 94. The cutter bar is moved to this position manually and is retained in that position by disconnectible or detachable means in the form of a transport rod 145 provided at one end with a hook 146 and at its other end with an eye 147 to which is attached an eye bolt 148 which is receivable through a connection element comprising an intermediate apertured portion 95a of the cutter bar 95 (Figure 4). The eye bolt 148 constitutes part of means to secure the transport rod 145 to the cutter bar 95, the means being completed by a tail nut 149. The hooked end of the transport rod 145 is hooked into the outermost aperture 111 of the ball crank 106 when the mower is being transported.

In the use and operation of the mower structure just described, the mower frame 30 is carried on the tractor drawbar 15 by means of the hitching structure 33, the wedges 41 and 43 and the pin or bolt 44 being inserted in their cooperating apertures for the purpose of rigidly securing the mower to the drawbar. For normal cutting operation, the cutting mechanism 90 assumes the position shown in Figure 1. The ground-engaging shoe 100 rides on the ground and the cutting mechanism has limited floating vertical movement about the pivots 92—93 on the support or casting 69. It will be understood, of course, that in the mounted position of the mower, the skid 131 is clear of the ground. Inasmuch as the connection between the power control arm 14 and the bell crank 106 includes the lifting chain 120, the connection is flexible and the lifting and lowering means does not interfere with the rise and fall of the cutting mechanism. In the event that the cutter bar 95 encounters an obstacle in the field, the resistance to forward travel of the cutting mechanism is sufficient to overcome the spring-loaded release mechanism 60, whereupon the latches 62 and 63 are released from the pintle 61 so that the mower structure may swing rearwardly with respect to the tractor, the rearward swinging movement taking place about the pivot 50 between the transverse members 31 and 32. It will be understood, of course, that the lower member 32, being part of the hitch structure 33, remains with the tractor and the upper member 31, being part of the main mower structure, swings rearwardly with the cutting mechanism and associated parts. Inasmuch as the sheave 121 is located substantially directly above the pivot 50, there will be no interference of the lifting means with rearward swinging of the cutting mechanism. The cutting mechanism may be reconnected for normal operation by backing the tractor until the release mechanism 60 is again connected, a procedure that is familiar to those skilled in the art.

The cutter bar 95 may be pivoted upwardly about the pivots 96—97 on the yoke 94 by means of application of power to the bell crank 106 through the medium of the power control arm 14 and lifting chain 120, the arm 14 rocking forwardly and upwardly to tighten the chain and to rock the bell crank 106 in a counterclockwise direction (as viewed in Figures 1 and 2). This action of the bell crank is assisted, of course, by the tension spring 125, and the arm 107 of the bell crank moves upwardly to stress or tension the link means 117—118, thereby effecting a leverage multiplication through the gag lever mechanism 115, the latter function being also well known to those skilled in the art. Rocking of the bell crank 106 in the direction indicated, and for a limited extent, serves to pivot the cutter bar 95 upwardly about the pivot axis 96—97 for the purpose of raising the cutter bar over slight obstacles in the field. Further rocking of the bell crank 106 by the power control arm 14 in the same direction raises the cutter bar still higher and ultimately pivots the drag bar 91 upwardly about its pivot 92—93, upward movement of the drag bar being limited by the member 140 as aforesaid. Reversal of power to the arm 14 provides for lowering the cutting mechanism. In the ordinary case, this result is accomplished by merely exhausting the fluid pressure system (not shown) with which the arm 14 is associated so that the cutting mechanism will return to normal or operating position by virtue of its own weight.

When it is desired to transport the tractor and mowing unit, as from one field to another, or any considerable distance, the cutting mechanism is first raised to its maximum extent by means of the power control arm 14, whereupon the drag bar 91 will strike the stop member 140, thus disposing the grassward end of the cutter bar at a suitable level above the ground. The control arm 14 is held in this maximum upward position of the coupling bar 91 by suitable control mechanism (not shown) associated with the arm. The transport rod 145, which is normally carried in a convenient place on the tractor, is then utilized to carry the cutter bar in the position shown in Figure 4, the cutter bar being raised manually to its vertical position. This result is accomplished by hooking the hooked end 146 of the transport rod 145 in the outer aperture 111 in the arm 107 in the bell crank 106. The other end of the transport rod 145 is connected by the means 147—149 to the cutter bar 95, as shown. Care must be taken to connect the inner end of the transport rod 145 to the bell crank 106 by means of the aperture 111 and not the notch 112, since in the transport position of the cutter bar 95, as shown in Figure 4, vibration of the machine during travel may dislodge the inner end of the rod from the notch.

When it is desired to disconnect the mower from the tractor, the cutting mechanism is first placed in the normal or cutting position shown in Figure 1. The one end of the transport rod 145 is connected by the means 147—149 to the cutter bar portion 95ᵃ as was the case when the cutter bar was raised to transport position as shown in Figure 4. The cutter bar is then elevated to a height sufficient to permit connection between the hooked end 146 of the rod and the notch 112 of the arm 107 on the bell crank 106. In other words, this preliminary position will closely approximate that shown in Figure 4, except that the rod 145 is hooked into the notch 112 rather than into the outer aperture 111. The operator, using the rod 145 as a force transmitting means, then forcibly pulls the cutter bar downwardly about its pivot axis 96—97 until it reaches its normal or horizontal position. The gag lever 116 provides a relatively short lever arm movable through a relatively short angular range and acts between the bell crank 106 and cutter bar 95 to normally stress the link means 117—118. On the other hand, the lever arm included in that part of the cutter bar between the pivot 96—97 and the connection portion or element 95ᵃ is relatively long and movable through a substantially relatively longer angular range than that of the lever arm 116. Hence, the connection of the rod 145 between 95ᵃ and 112 provides motion-multiplying means effective to materially increase the travel of the bell crank 106 in a clockwise direction as viewed in Figures 2 and 4, with the result that the normal stress in the link means 117—118 is removed. Having thus depressed the cutter bar to its normal or horizontal position the operator may maintain the cutter bar in this position by standing on it as shown in Figure 5. While thus holding the cutter bar in forcibly depressed position, the operator may disconnect the link means 117—118 by means of removing the S-hook 118 from the inner aperture 110 in the arm 107. If desired, the link means may be completely removed by disconnecting the hooked lower end thereof from the arm 116 of the gag lever mechanism 115. Figure 2 shows the parts with the link means completely removed.

The forcible depression of the cutter bar 95 results in temporarily overloading the spring 125 so that the spring is stretched a sufficient distance to relieve stress or tension on the link means 117—118 so that the latter may be removed. The operation just described is a simple one and depends merely upon using the cutter bar 95 as a lever for stretching the spring 125 so that the detachable link means 117—118 may be removed. A similar result may be obtainable in any implement structure having corresponding parts.

After the operator has removed the link means 117—118, he may slowly relieve pressure on the cutter bar 95 so that it may move upwardly to an extent permitting the tension spring 125 to retract itself to no-load condition, after which the rod 145 may be disconnected from the notch 112 in the bell crank 106, and the cutter bar may be again lowered to its horizontal position. The operation just described thus relieves tension on the spring 125 for the purposes aforesaid.

The next step in the procedure for detaching the tractor requires the disconnection of the lifting chain 120 from the control arm 14. The drawbar lifting chain 24 is then connected between the arm 14 and the drawbar 15. The safety shield section 81 is then removed, and the drawbar release means 20 is disconnected from the locking plate 19 so that the drawbar may be lowered under control of the power control arm 14. The securing bolt 44 and wedges 41 and 43 are removed to condition the hitching structure 33 for disconnection from the drawbar. The power control arm is then actuated to lower the drawbar 15, together with the mower structure, until the mower structure rests on the ground in the position shown in Figure 2, in which position it will be supported by the skid 131 and the ground-engaging shoe 100, the member 140 being engaged between the bracket 64 and intermediate portion of the drag bar 91. The tractor may then be driven forwardly away from the mower structure.

The procedure for mounting the mower on the tractor is just the reverse of that described, and is briefly as follows: The tractor, with its drawbar 15 set for vertical movement by the control arm 14 and lifting chain 24, is backed toward the mower until the bar 18 is received by the hitching structure 33. The power control arm 14 is then actuated to raise the drawbar, together with the mower structure, to the normal operating height of the mower, after which the locking means 20 is connected with the locking plate 19 to hold the drawbar 15 in a fixed position. The lifting chain 24 is then removed and the end of the lifting chain 120 is connected to the arm 14. Inasmuch as the portions 38 and 39 of the hitching structure 33 engage the transverse drawbar member 18 from above and the bight portion 34 engages the member 26 from below, the mower structure cannot tip rearwardly about the bar 18 as a fulcrum; therefore, it is possible to elevate the mower to its normal height without securing same to the drawbar by the wedges 41 and 43 and bolt 44. After the drawbar is secured in place, the wedges and bolt are applied to complete the connection between the mower and tractor, and the pivoted spring clips 47 and 48 are swung over on top of the wedges to keep the latter in place. The transport rod 145 may then be applied between the cutter bar 95 and bell crank 106 for the purpose of stretching the spring 125 sufficiently to permit reconnection of the detachable link means 117—118 between the bell crank and the gag lever mechanism 115. Reconnection of the power take-off shafting and attachment of the safety shield section 81 completes the procedure and the mower is ready for operation.

We are aware that the principles of the invention as set forth herein are applicable to a wide variety of circumstances and that each case may require changes in the design or proportion of certain of the parts. The present disclosure is based upon a preferred form of the invention and is therefore not intended to be exclusive of other forms that the invention may take, since the invention is capable of various modifications and alterations, all of which may be accomplished without departing from the spirit and scope of the invention as set forth in the appended claims.

We claim:

1. A mower of the type adapted to be mounted on and dismounted from the drawbar of a tractor, comprising: a generally horizontal frame; means on the frame for connection to and disconnection from a tractor drawbar; means at the stubbleward side of the frame including depending structure; means extending grasswardly from the depending structure including cutting mechanism having a drag bar pivoted on a longitudinal axis to said structure and provided with a ground engaging shoe at its grassward end, a longitudinal drive shaft journaled in said structure, and a transverse pitman connected at its stubbleward end to said shaft; means carried by said structure including a support disposed below and in protective relationship to the stubbleward ends of the drag bar and pitman and providing means for engaging the ground to support the stubbleward end of the frame when the frame is dismounted from the tractor drawbar; and means carried by a grassward portion of the frame and depending rigidly therefrom to a terminal end portion spaced normally above the drag bar and effective to engage the drag bar at times during operation of the mower to provide a stop for limiting upward swinging of the drag bar about the aforesaid longitudinal axis, said stop means further engaging the drag bar when the frame is dismounted from the tractor to provide means for supporting the grassward end of the frame from the ground through the medium of the drag bar and shoe.

2. The invention defined in claim 1, further characterized in that: the support is in the form of a skid extending longitudinally of the frame and combining with the shoe to provide means for facilitating moving of the mower while it is on the ground when dismounted from the tractor.

3. The invention defined in claim 1, further characterized in that: the support extends longitudinally from the depending structure to provide a portion spaced from said structure, a brace is connected at its stubbleward end to said portion and extends diagonally grasswardly to a grassward end in proximity to the cutting mechanism, and means is provided for connecting the grassward end of the brace to a grassward portion of the drag bar.

4. A mower, comprising: a single transverse horizontal bar having at its stubbleward end means including a pair of laterally spaced apart angle members providing a pair of longitudinally and vertically extending, laterally spaced apart mounting flanges having upper and lower flange portions projecting respectively above and below the bar; a support positioned between the flanges and depending below the bar and having portions thereof rigidly secured to said upper and lower flange portions; cutting mechanism carried by the support at a level below the bar and extending grasswardly from the support; and drive means for the cutting mechanism including a rotatable member journaled in the support.

5. The invention defined in claim 4, further characterized in that: a diagonal brace is rigidly connected between the depending portion of the support and a grassward portion of said bar.

6. The invention defined in claim 4, further characterized in that: the cutting mechanism includes a drag bar carried by the support for vertical movement with respect thereto and extending laterally therefrom substantially directly below the transverse bar, and said transverse bar includes a depending stop at its grassward end portion for limiting upward movement of the drag bar.

7. The invention defined in claim 4, further characterized in that: a ground-engaging member is carried below the support; the cutting mechanism includes a ground-engaging shoe spaced grasswardly from said ground-engaging member; and the grassward end portion of the transverse bar includes a depending member engageable with a part of said cutting mechanism so that the transverse bar may be supported on the ground by means of the ground-engaging member and ground-engaging shoe via engagement of said depending member with said cutting mechanism part.

8. In an implement having a frame and an implement part carried by the frame for movement selectively from and to a first position toward which the implement part has an initial bias, the improvement comprising: a member associated with the frame for movement relative thereto in a first direction, in opposition to the initial bias of the implement part, and also in a second direction, in accord with the initial bias of the implement part; means connected between the member and the frame for biasing the member in its first direction and yieldable to accommodate movement of the member in its second direction; load-transmitting means having a connection between the member and the implement part and normally stressed between said member and part by the opposition of one bias to the other, said connection including releasable lost-motion means effective to provide for release of the load-transmitting means upon removal of stress from said load-transmitting means; first and second connection elements on the member and on the implement part separate from the connection of the load-transmitting means between said member and part; and a force-transmitting means detachably connectible between said connection elements in parallel with the load-transmitting means and effective upon movement of the implement part toward its normal position to transmit force to the member to move the member in its second direction, said connection elements and force-transmitting means including motion-multiplying means to increase said second-direction movement of the member sufficiently to remove stress from the load-transmitting means so as to effectuate said releasable lost-motion means.

9. In an implement having a frame and an implement part carried by the frame for movement about a pivot selectively from and to a position toward which the implement part has an initial bias, the improvement comprising: a member associated with the frame for movement relative thereto in a first direction, in opposition to the initial bias of the implement part, and also in a second direction, in accord with said initial bias; yielding means connected between the member and the frame for biasing the member in its first direction and yieldable to accommodate movement of the member in its second direction; load-transmitting means connected between the member and the implement part and normally stressed between said member and part because of opposition of one bias to the other, said load-transmitting means including a first lever arm acting between the member and implement part and movable through a relatively short angular range, said load-transmitting means further including a releasable lost-motion connection effective for release upon removal of stress from said load-transmitting means; first and second connection elements respectively on the member and the implement part, said second connection element being so spaced from the pivot of the implement part as to constitute that portion of the implement part between said pivot and said second connection element a second lever arm movable through a relatively longer angular range than the aforesaid first lever arm; and force- transmitting means connectible between said second lever arm and the member to increase the second-direction movement of the member by force applied to the implement part against the bias of the aforesaid yielding means so as to remove stress from, and thus to provide for release of, the load-transmitting means.

10. In a harvester having a frame and a cutter bar carried thereby on a horizontal pivot for vertical movement through a range including a horizontal operating position toward which it is biased because of its own weight and a vertical transport position to which it must be forcibly raised, the improvement comprising: an arm rockable on the frame and having a portion provided with an aperture and a notch; spring means connected between the arm and frame and biased to urge the arm to rock in a direction opposing the weight bias of the cutter bar; detachable link means having a connection at one end to the cutter bar relatively close to the cutter bar pivot and a connection at its other end to the arm via the aperture and normally stressed between the arm and cutter bar because of the opposition of one bias to the other, one of said connections including lost-motion means effective upon shortening of the distance between said first aperture and the cutter bar to provide for detachment of the link means; and a transport rod detachably connectible at one end to the cutter bar at a point relatively remote from the cutter bar pivot and detachably connectible at its other end to the notch in the arm to provide for forcible depression of the cutter bar to increase the movement of the arm against the bias of the spring means for shortening the aforesaid distance and thus to relieve stress on the link means so that the link means may be disconnected between the arm and cutter bar.

11. In a mower having a frame including a stubbleward portion and a grassward portion spaced therefrom and cutting mechanism carried by a pivot at the stubbleward portion and extending grasswardly therefrom for vertical movement about said pivot from a horizontal operating position to which it is biased because of its own weight and a vertical transport position to which it must be forcibly moved, the improvement comprising: a bell crank pivoted on the grassward portion of the frame on a longitudinal axis and including a first arm movable vertically and a second arm movable laterally; spring means connected between the second bell crank arm and the stubbleward portion of the frame and tensioned to bias the second arm stubblewardly and the first arm upwardly in opposition to the bias of the cutting mechanism; link means having a detachable connection between the cutting mechanism and the first arm and normally tensioned by the opposition of the spring means to the bias of the cutting mechanism, said connection including lost-motion means effective upon relief of tension in the link means to provide for detachment of said link means; and force-transmitting means having a detachable connection to the first arm and a detachable connection to the cutting mechanism providing for forcibly depressing the cutting mechanism and rocking the bell crank to temporarily stretch the spring means, said force-transmitting means and detachable connections being so constructed and arranged as to increase the travel of the bell crank in the direction required to shorten the distance between the first arm and the cutting mechanism and thus to relieve tension in the link means so that the link means may be detached.

12. In an implement having a frame and an implement part carried thereby for vertical movement from a lowered operating position in which it tends to remain because of its own weight and a raised transport position to which it must be forcibly moved, the improvement comprising: a member movable on the frame; detachable link means connected and stressed between the implement part and the member so that said part and member may move in unison; spring means connected between the frame and the member and tensioned to urge the member in one direction to operate through the stressed link means to tend to balance the tendency of the implement part to remain in operating position; and motion-multiplying means detachably connectible between the member and implement part in parallel with the link means so that the implement part may be held downwardly and used as a lever to urge the member in the opposite direction for temporarily holding the member against the tension of the spring means to provide for disconnection of the link means.

WILBUR J. COULTAS.
NOLAN D. COLVIN.
WILLIAM B. PALMER.

REFERENCES CITED

The following references are of record in the file of this patent:

UNITED STATES PATENTS

| Number | Name | Date |
|---|---|---|
| Re. 21,819 | Korsmo et al. | Jan. 3, 1941 |
| Re. 22,279 | Hyman et al. | Mar. 2, 1943 |
| 1,274,499 | Beasley | Aug. 6, 1918 |
| 1,861,816 | Rawls | June 7, 1932 |
| 1,973,993 | Pearson | Sept. 18, 1934 |
| 2,098,948 | Foushee et al. | Nov. 16, 1937 |
| 2,135,621 | Millard | Nov. 8, 1938 |
| 2,269,980 | MacDonald | Jan. 13, 1942 |
| 2,454,697 | Hilblom | Nov. 23, 1948 |
| 2,490,894 | Zink et al. | Dec. 13, 1949 |